United States Patent [19]

Brandenstein

[11] Patent Number: 4,524,855
[45] Date of Patent: Jun. 25, 1985

[54] HYDRAULIC RELEASE ARRANGEMENT, ESPECIALLY FOR VEHICLE CLUTCHES

[75] Inventor: Manfred Brandenstein, Eussenheim, Fed. Rep. of Germany

[73] Assignee: SKF Kugellagerfabriken GmbH, Schweinfurt, Fed. Rep. of Germany

[21] Appl. No.: 410,509

[22] Filed: Aug. 23, 1982

[30] Foreign Application Priority Data

Aug. 27, 1981 [DE] Fed. Rep. of Germany ....... 3133968

[51] Int. Cl.³ ...................... F16D 25/08; F16D 25/12
[52] U.S. Cl. .................. 192/88 A; 92/98 D; 92/101; 192/91 A; 192/98
[58] Field of Search ............ 192/85 CA, 88 A, 91 A, 192/98; 92/98 D, 98 R, 99, 101, 43

[56] References Cited

U.S. PATENT DOCUMENTS

| 2,241,056 | 5/1941 | Chilton | 92/101 |
| 3,298,470 | 1/1967 | Russell | 92/98 D |
| 3,326,089 | 6/1967 | Machado | 92/98 D |
| 4,069,904 | 1/1978 | Garrett et al. | 192/88 A |

FOREIGN PATENT DOCUMENTS 2348044 4/1974 Fed. Rep. of Germany ... 192/88 A
1396864 6/1975 United Kingdom .

Primary Examiner—Rodney H. Bonck
Attorney, Agent, or Firm—Daniel M. Rosen

[57] ABSTRACT

A hydraulic release arrangement, especially for vehicle clutches, consisting of a housing (1,2,3) with a pressure space (6) sealed by a rolling bellows (7), in which the release bearing (4) is arranged to be displaceable in the housing (1,2,3) in the axial direction.

In order to produce a compact hydraulic release arrangement and inhibit the bending in of the rolling bellows (7) in the low pressure range, a spacing element (27) is provided in the space defined by the rolling bellows (7) between the release bearing (4) and the housing (1,2,3), the spacing element being arranged to abut the inside of the bellows wall with axial prestress with an annular projection in at least one turned-back region (30) of the rolling bellows (7).

7 Claims, 1 Drawing Figure

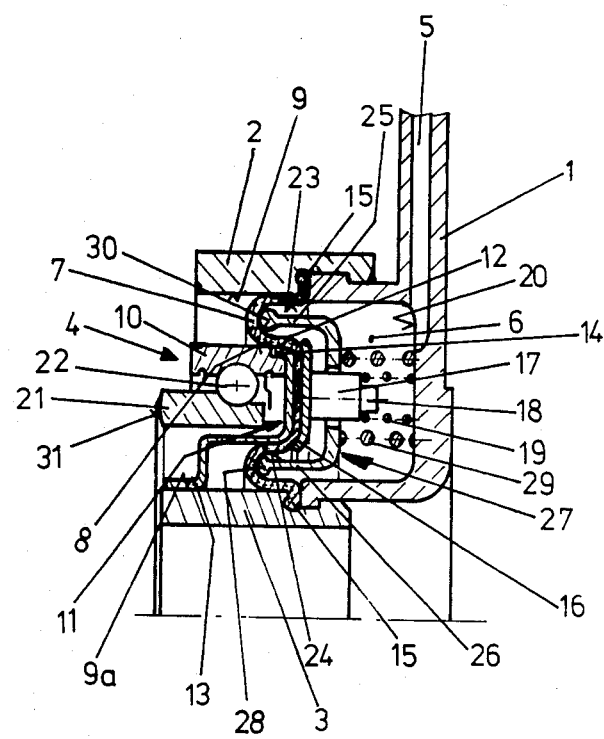

HYDRAULIC RELEASE ARRANGEMENT, ESPECIALLY FOR VEHICLE CLUTCHES

This invention relates to an hydraulic release arrangement, especially for vehicle clutches, which consists of a housing with a pressure space sealed by a rolling bellows, in which the release bearing is arranged to be moveable in the housing in the axial direction.

One hydraulic release arrangement of this type is disclosed in U.S. Pat. No. 4,069,904. In this known arrangement a crack location can form in the turned-back region of the rolling bellows since the rolling membrane flexes in the low negative pressure range, for example, in the assembly and disassembly of the release arrangement. This can lead to the destruction of the rolling bellows and to failure of the release arrangement.

The object of the present invention is the production of a compact hydraulic release arrangement of the above type in which the inward bending of the rolling bellows in the low pressure range is effectively prevented, for example, during the assembly and disassembly of the release arrangement.

This object is solved in accordance with the present invention in that a spacing element is provided in the region defined by the rolling bellows between the release bearing and the housing, the spacing element abutting the inner surface of the bellows wall with axial prestress with an annular projection in at least one folded region of the rolling bellows.

A weak engagement of the spacing element on the rolling bellows results from the relatively small axial prestress and the rolling back of the bellows during axial movement of the release bearing is just prevented.

In order that the invention may be more clearly understood, it will now be disclosed in greater detail with reference to the single FIGURE of the drawings, which illustrates a partial cross sectional view of an hydraulic release in accordance with the invention, on one side of the axis thereof.

The hydraulic release arrangement illustrated in the FIGURE consists, for example, of a three part housing 1, 2, 3 and a release bearing 4. The housing part 1 is provided with a bore 5 for guiding the pressure medium into the pressure medium work space 6 which is extended in the axial direction by means of two concentrically arranged annular housing parts 2, 3. The annular housing parts 2, 3 are connected to the part 1 of the housing, for example, by a thread. The pressure medium filled space 6 is closed on the outside by a rolling bellows (seal) 7 of strong rubber or a similar material, which has a circular section 8 for receiving the release bearing 4. A relatively large play is provided between the release bearing 4 and the bore 9 of the annular housing part 2, into which the section of the rolling bellows 7 extends. The non-rotating bearing ring 10 is provided with a cup-shaped sheet metal part 11 which is provided with cylindrical sections 12, 13 toward the clutch and is affixed on the surface of the non-rotating bearing ring 10 with the section 12 in annular groove 14. The other cylindrical section 13 is arranged to be displaceable on the outer surface 9a of the housing part 3. The outer rim 15 of the rolling bellows 7 is clamped between the part 1 of the housing and the concentrically arranged annular housing parts 2, 3. The rolling bellows 7 is supported on the bore surface 9 of the housing part 2 and the outer surface 9a of the housing part 3, covers a part of the non-rotating bearing ring 10, and abuts on the annular sheet metal part 11 on the side thereof away from the clutch. An annular pressure plate 16 with several pins 17 distributed about its circumference is provided in the pressure medium filled space 6, the pressure plate backing the rolling bellows on the side thereof away from the clutch. Springs 19 are provided on the set back sections 18 of the pins 17, the springs 19 engaging the housing wall 20, and engage the rotating bearing ring 21 of the release bearing 4 against the clutch spring (not shown) of the clutch, whereby the balls 22 are held in fixed contact with the race of the non-rotating bearing ring 10 and the rase of the rotating bearing ring 21. The annular projections 25, 26 of a spacing element 27 formed as a ring with U-shaped cross-section extend into the space defined by the rolling bellows 7 between the release bearing 4 and the annular housing part 2, 3 respectively, the free ends of the spacing element 27 being provided with bulge shaped thickened portions 28. The spacing element 27 is pressed with minimum axial prestress against the inner side of the bellows wall in the folded region 30 of the rolling bellows 7 by a spring 29 supported on the housing part 1, so that a light engagement of the spacing element 27 on the rolling bellows 7 is produced. A pressure is produced in the space 6 for the release of the clutch, the pressure acting on the non-rotating bearing ring 10. This release force is transmitted to the inner ring 21 of the release bearing 4 by way of the balls 22, the facing surface 31 of the inner ring 21 pressing against the clutch plate spring (not shown). The release bearing 4 acts somewhat as a piston which moves the clutch plate spring to the left and releases the clutch.

The described embodiment represents only one example of a hydraulic release arrangement in accordance with the invention. Changes in the construction of the individual parts are within the scope of the invention without further explanation. For example, the pressure space closed by the rolling bellows may not only be formed as an annular space, but in the case of a shaft which does not extend therethrough, it also may be in the form of a cylindrical space and the spacing element formed as a cup-shaped shell which engages an annular projection in the folded region of the rolling bellows. Furthermore, it is also possible to prepare the parts of the housing from plastic material and to connect them with one another by snap connections or the like.

What is claimed is:

1. In an hydraulic release device comprising an annular housing having radially inner and outer walls and an end wall, an annular rolling bearing having inner and outer rings and positioned in the space between said walls and radially spaced therefrom, and a rolling bellows sealed between said inner and outer walls to define with said inner and outer walls and end wall a pressure chamber, said bearing being arranged to be axially moved in said space by said rolling bellows; the improvement comprising an annular pressure plate within said pressure chamber coaxial with said rolling bellows and axially abutting said rolling bellows, first spring means biasing said pressure plate away from said end wall, said rolling bellows having folded-back regions at said inner and outer walls, an annular spacing element within said pressure chamber and having inner and outer annular projections engaging the folded-back regions of the rolling bellows adjacent the inner and outer walls of the housing respectively toward said pressure chamber, and second spring means biasing said annular spacing element away from said end wall.

2. The hydraulic release device of claim 1 wherein said first spring means comprises a plurality of first springs extending between said end wall and pressure plate means.

3. The hydraulic release device of claim 2 wherein said second spring means comprises a spring extending between said annular spacing element and said end wall.

4. In an hydraulic release device comprising an annular housing having radially inner and outer walls and an end wall, an annular rolling bearing having inner and outer rings and positioned in the space between said walls and radially spaced therefrom, and a rolling bellows sealed between said inner and outer walls to define with said inner and outer walls and end wall a pressure chamber, said bearing being arranged to be axially moved in said space by said rolling bellows; the improvement comprising an annular pressure plate within said pressure chamber coaxial with said rolling bellows and axially abutting said rolling bellows, first spring means biasing said pressure plate away from said end wall, said rolling bellows having folded-back regions at said inner and outer walls, an annular spacing element within said pressure chamber and having inner and outer annular projections engaging the folded-back regions of the rolling bellows adjacent the inner and outer walls of the housing respectively toward said pressure chamber, and second spring means biasing said annular spacing element away from said end wall, said first spring means comprising a plurality of first springs extending between said end wall and pressure plate means, said pressure plate comprising a plurality of axially extending pins toward said end wall, each of said first springs engaging a separate one of said pins.

5. In an hydraulic release device comprising an annular housing having radially inner and outer walls and an end wall, an annular rolling bearing having inner and outer rings and positioned in the space between said walls and radially spaced therefrom, and a rolling bellows sealed between said inner and outer walls to define with said inner and outer walls and end wall a pressure chamber, said bearing arranged to be axially moved in said space by said rolling bellows; the improvement comprising an annular pressure plate within said pressure chamber coaxial with said rolling bellows and axially abutting said rolling bellows, first spring means biasing said pressure plate away from said end wall, said rolling bellows having folded-back regions at said inner and outer walls, an annular spacing element within said pressure chamber and having inner and outer annular projections engaging the folded-back regions of the rolling bellows adjacent the inner and outer walls of the housing respectively toward said pressure chamber, and second spring means biasing said annular spacing element away from said end wall, said first spring means comprising a plurality of first springs extending between said end wall and pressure plate means, said annular spacing element having a U-shaped cross-section, said inner and outer projections comprising bulge-shaped thickened portions on the ends of said U-shaped cross-section.

6. The hydraulic release device of claim 5 wherein said pressure plate comprises pins extending axially through apertures in said annular spacing element, said first spring means comprising separate springs extending between said pins and said end wall.

7. The hydraulic release device of claim 5 wherein an annular sheet metal element is affixed to the axial end of one of said bearing rings toward said pressure chamber, said sheet metal element abutting the side of said rolling bellows away from said pressure chamber and having a cylindrical portion displaceable on said inner wall, whereby said sheet metal element holds said bearing spaced from said inner and outer walls.

* * * * *

UNITED STATES PATENT AND TRADEMARK OFFICE
CERTIFICATE OF CORRECTION

PATENT NO. : 4,524,855
DATED : June 25, 1985
INVENTOR(S) : Manfred Brandenstein

It is certified that error appears in the above-identified patent and that said Letters Patent is hereby corrected as shown below:

Column 2, line 13, change "rase" to --race--.

Column 3, line 23, change "backregions" to --back regions--.

Signed and Sealed this

Twenty-ninth Day of July 1986

[SEAL]

Attest:

DONALD J. QUIGG

Attesting Officer

Commissioner of Patents and Trademarks